(No Model.)　　　　　　　　　　　　　　　　　　　8 Sheets—Sheet 1.
E. LIPPITT.
BUTTON MAKING MACHINE.

No. 552,067.　　　　　　　　　　　　　Patented Dec. 24, 1895.

Fig. 1.

Witnesses  
Raymond Barnes.  
F. Stanley Eshum.

Inventor  
Elihu Lippitt  
By P. T. Dodge  
Attorney (No Model.) 8 Sheets—Sheet 3.
E. LIPPITT.
BUTTON MAKING MACHINE.
No. 552,067. Patented Dec. 24, 1895.

Fig. 3.
on line 3—3.

(No Model.) 8 Sheets—Sheet 4.

E. LIPPITT.
BUTTON MAKING MACHINE.

No. 552,067. Patented Dec. 24, 1895.

Fig. 4.
on line 4-4.

Witnesses
Raymond T. Barnes.
F. Stanley Ellsworth

Inventor
Elihu Lippitt
By P. T. Dodge
Attorney (No Model.) 8 Sheets—Sheet 6.
E. LIPPITT.
BUTTON MAKING MACHINE.

No. 552,067. Patented Dec. 24, 1895.

Fig. 6.
on line 6-6.

Fig. 7.
on line 7-7.

Fig. 8.
on line 8-8.

Witnesses
Raymond P. Barnes.
F. Stanly Ellison.

Inventor
Elihu Lippitt
By P. T. Dodge
Attorney (No Model.) 8 Sheets—Sheet 7.
E. LIPPITT.
BUTTON MAKING MACHINE.

No. 552,067. Patented Dec. 24, 1895.

Witnesses
Inventor
Elihu Lippitt
By P. T. Dodge
Attorney (No Model.)  8 Sheets—Sheet 8.

E. LIPPITT.
BUTTON MAKING MACHINE.

No. 552,067.  Patented Dec. 24, 1895.

Fig.13.

Fig.14.
on line 14–14.

Witnesses
Raymond F. Barnes.
F. Stanley Elmore.

Inventor
Elihu Lippitt
By P. T. Dodge
Attorney

UNITED STATES PATENT OFFICE.

ELIHU LIPPITT, OF LA CROSSE, ASSIGNOR, BY DIRECT AND MESNE ASSIGNMENTS, TO THE BADGER PEARL BUTTON COMPANY AND E. J. POPE, OF EAU CLAIRE, WISCONSIN.

BUTTON-MAKING MACHINE.

SPECIFICATION forming part of Letters Patent No. 552,067, dated December 24, 1895.

Application filed September 13, 1892. Serial No. 445,805. (No model.)

*To all whom it may concern:*

Be it known that I, ELIHU LIPPITT, of La Crosse, county of La Crosse, and State of Wisconsin, have invented a new and useful Improvement in Button-Making Machines, of which the following is a specification.

My invention relates to button-making machines; and it consists of a mechanism adapted to act successively on the blank to face, center, drill, and back the same, and, finally, to attach the finished button to a tape or band.

The invention also consists in the details of construction and combinations of parts hereinafter described.

In the accompanying drawings.

Figure 16:
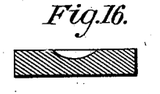
Figure 17:
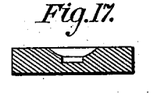
Figure 19:
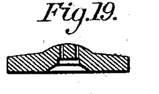
Figure 20:
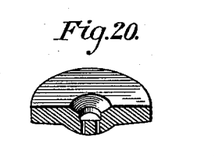
Fig. 20 is a perspective sectional view of the completed button.

In my machine six blanks are operated on at one time, and each is successively presented to mechanisms which act first to form in the upper face of the blank a depression, as represented in Fig. 16. The blank is next presented to a centering device which forms in the depression a circular cavity, as represented in Fig. 17. It is next presented to a drilling mechanism by means of which two vertical holes are formed through the blank. The blank is then presented to the backing mechanism and in its course from the drilling mechanism to the backing mechanism it is automatically turned with the upper face downward. In this position the backing mechanism operates to cut away the upper surface and form thereon a projecting central portion, as shown in Fig. 19. From this mechanism the blank passes to a device by means of which the finished button is secured to a tape or band by staples.

Figure 1:
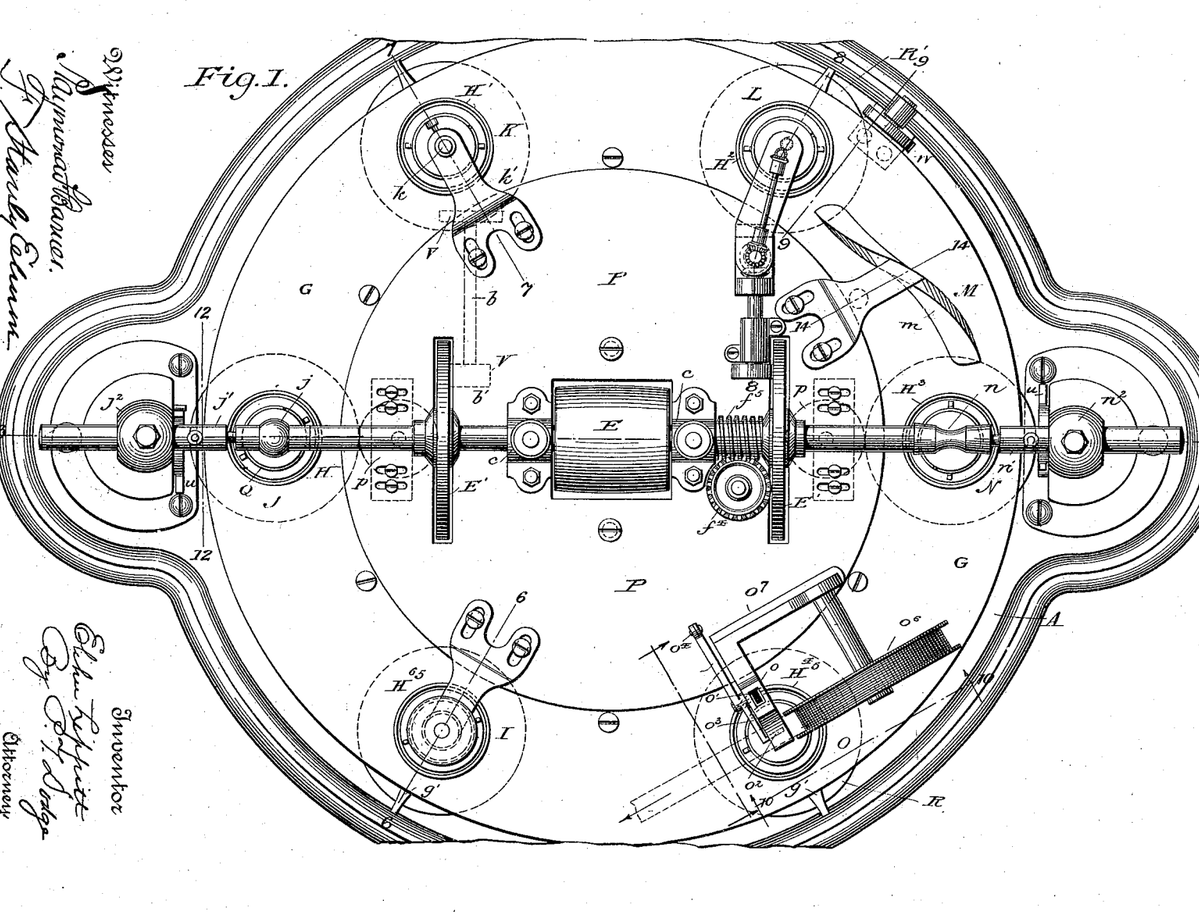
Figure 1 is a top plan view of my machine.
Figure 2:
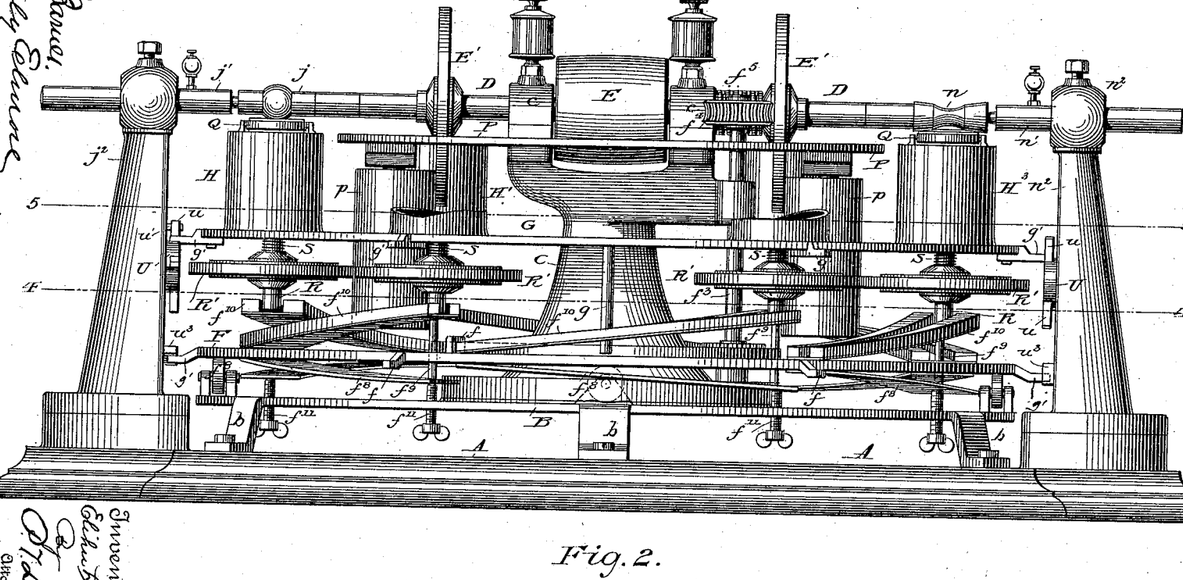
Fig. 2 is a side elevation of the same.
Figure 3:
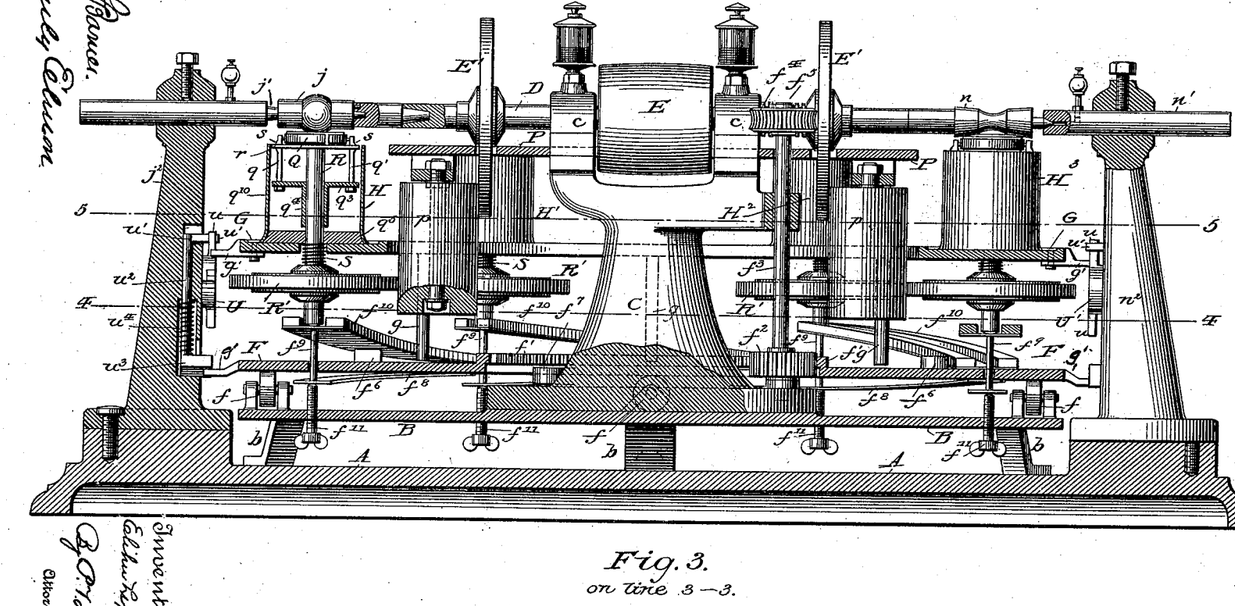
Fig. 3 is a longitudinal section through the machine on the line 3 3 of Fig. 1.
Figure 4:
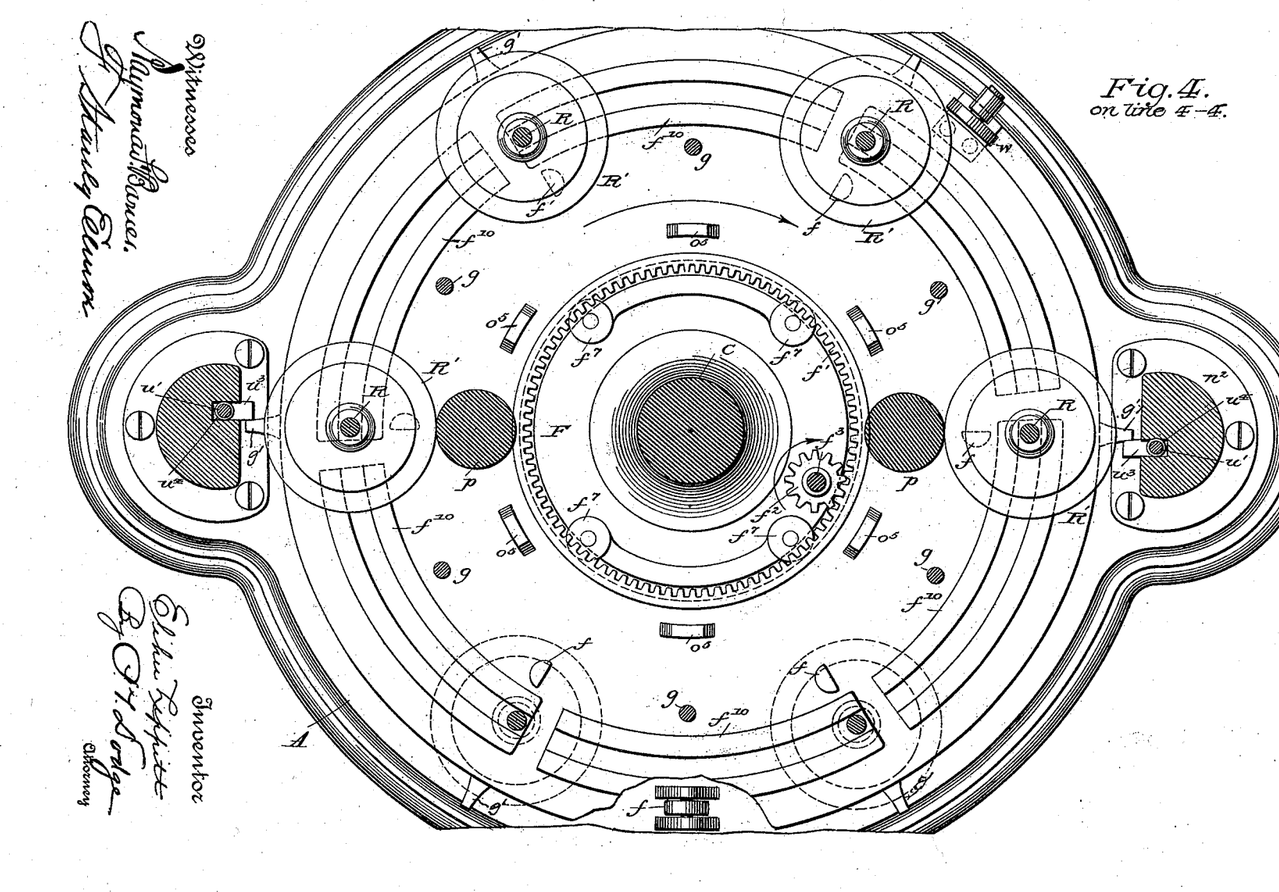
Fig. 4 is a horizontal section on the line 4 4 of Fig. 3.

Referring more particularly to Figs. 1 and 3, A represents a stationary base-plate or casting of approximately circular form.

B is a circular platform supported rigidly a slight distance above the base-plate at its center by means of legs $b$.

C represents a rigid post or standard rising from the center of the platform and provided with two vertical arms formed with journal-bearings $c$, in which a horizontal main driving-shaft D is mounted and driven by a pulley E, fixed thereto between the two vertical arms of the standard. From this shaft motion is imparted, through the medium of two vertical friction-wheels E' E', to the operative parts of the machine, as more fully described hereinafter.

Figure 5:
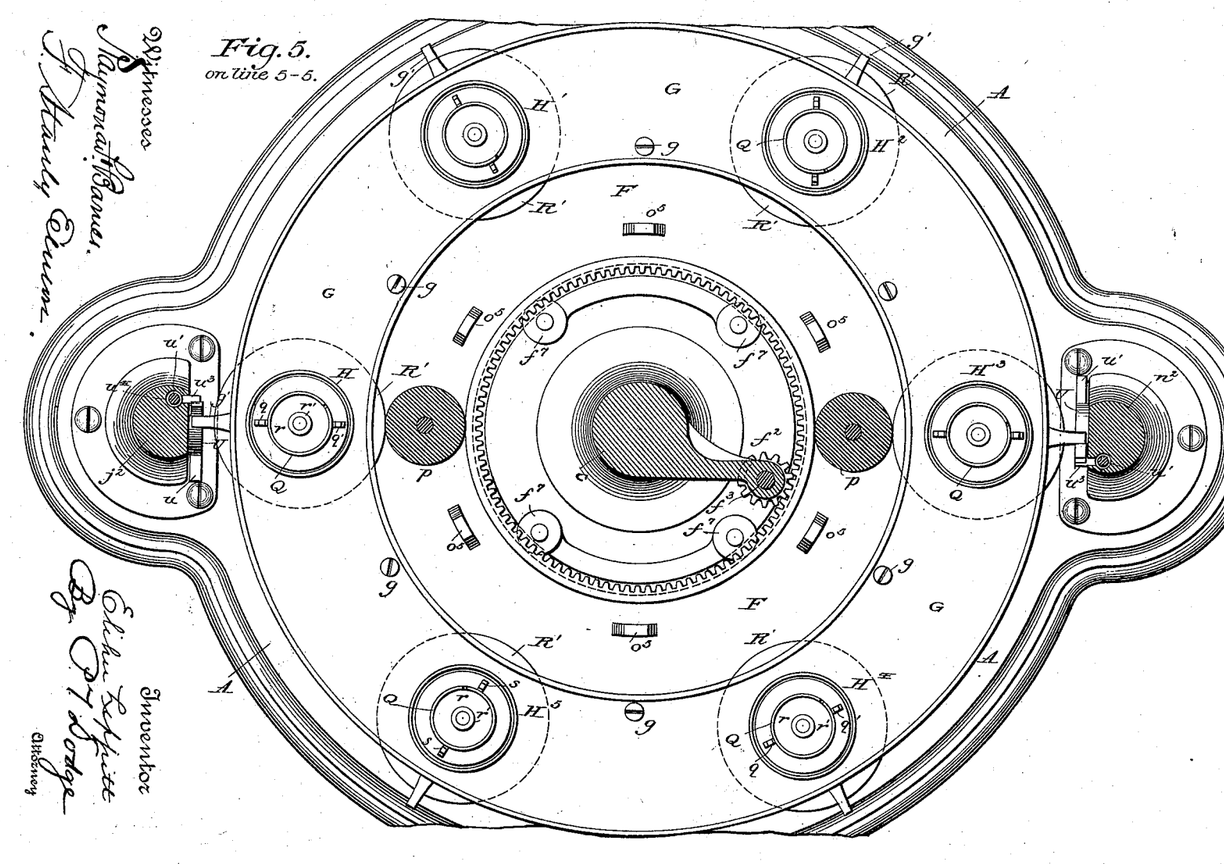
Fig. 5 is a horizontal section on the line 5 5 of Fig. 3.

F represents a continuously-rotating plate sustained above the platform on rollers $f$. This plate is provided at its center with an opening, through which the standard extends, and with an internal rack $f'$, arranged to be engaged by a pinion $f^2$, fixed to a vertical shaft $f^3$, mounted in bearings in the standard. This plate revolves at its center in contact with four rollers $f^7$, mounted at the base of the standard to turn on vertical axes, as shown in Figs. 3 and 5. The upper end of shaft $f^3$ carries a worm-wheel $f^4$, which is driven by a worm $f^5$ on the main driving-shaft.

G represents an intermittingly-moving annular plate surrounding the standard and located above the plate F. H H', &c., represent a series of button-blank-holding chucks, six in number, mounted on said plate at uniform distances apart and arranged to present the button-blanks successively to a filling device I, a facing mechanism J, a centering mechanism K, a drilling mechanism L, a turning device M, a backing mechanism N, and a device O for securing the finished button to a tape, all of which mechanisms are sustained by a horizontal plate P, rigidly secured to the standard and surrounding the same above the plate G.

Figure 13:
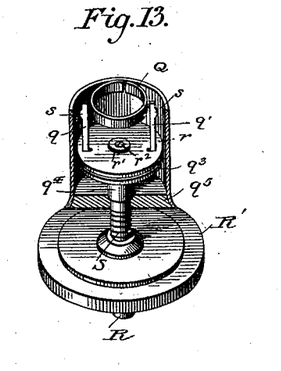
Fig. 13 is a perspective view of one of the blank-holding chucks, portions of the same being broken away to expose its internal construction.

Each of the chucks consists, as shown more particularly in Fig. 13, of a split ring Q, mounted at opposite sides in the upper ends of two vertical rods $q\ q'$, to turn on a horizontal axis. These rods are attached to a circular plate $q^3$, to the under side of which is secured a vertical sleeve $q^4$, seated loosely upon a second circular plate $q^5$, resting upon the annular plate G. The plate $q^5$ is encircled by the lower end of a vertical cylinder $q^{10}$, secured rigidly at its base, as shown, its upper end being open and terminating a slight distance below the split ring. Extending loosely through the annular plate G, the overlying plate $q^5$ and the sleeve $q^4$ is a shaft R, carrying at its upper end a circular plate $r$, secured rigidly thereto by a washer $r'$ and a screw $r^2$. This plate is provided at opposite sides with openings through which the rods $q\ q'$ extend, the arrangements being such that the plate may move freely up and down on the rods. At the lower end the shaft R is provided with a friction-wheel R', by which, at the proper time, the shaft is given a rotary motion. It is held normally down with the plate $r$ out of engagement with the split ring by a spiral spring S, encircling the shaft between the friction-wheel and plate G.

In operation, the circular button-blank is inserted within the split ring, which, when the plate on the end of the shaft R is elevated, is held in a horizontal position. In order that the blank may be held securely, so that there will be no liability of its turning within the ring, I provide the upper ends of the rods $q\ q'$, between which the ring is mounted, with cam-lugs $s$, against which the plate $q^3$ engages, the result being that the rods will be forced toward each other when the plate is elevated, thus clamping the ring on the blank and holding the same securely therein.

Figure 6:
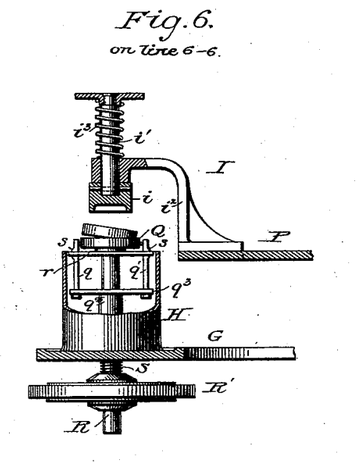
Fig. 6 is a vertical sectional elevation through the filling mechanism and one of the chucks on the line 6 6 of Fig. 1.

Referring to Fig. 6, the filling mechanism I, before alluded to, consists of a plunger $i$, carried at the lower end by a rod $i'$, mounted to slide vertically in the end of a bracket $i^2$, extending upward from the plate P. The upper end of the rod is provided with a head, beneath which and upon the bracket is seated a spiral spring $i^3$, which tends normally to sustain the plunger in an elevated position. In operation, one of the chucks being in position beneath the plunger, with the split ring open, a blank is placed thereon and the plunger depressed, thereby forcing the blank into the ring.

Referring to Fig. 3, the facing mechanism consists of a cylindrical body $j$, which may be of emery or other suitable abrading material. It is provided at its center with the outwardly-curved portion. This body is mounted in the end of the main driving-shaft to turn therewith, and is sustained at its opposite end by a horizontal centering-pin $j'$, fixed in the upper end of a post $j^2$, rising from the base-plate A. This centering-pin is adjusted in the usual manner longitudinally and is secured by a set-screw. When the blank is presented to this revolving abrading body it is held in the chuck in contact therewith and rapidly revolved on a vertical axis, the result being that the upper surface is ground and formed at its center with a depression, as shown in Fig. 16.

Figure 7:
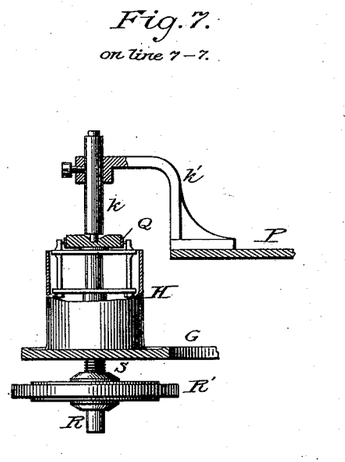
Fig. 7 is a vertical sectional elevation through the centering mechanism and one of the chucks on the line 7 7 of Fig. 1.
Figure 8:
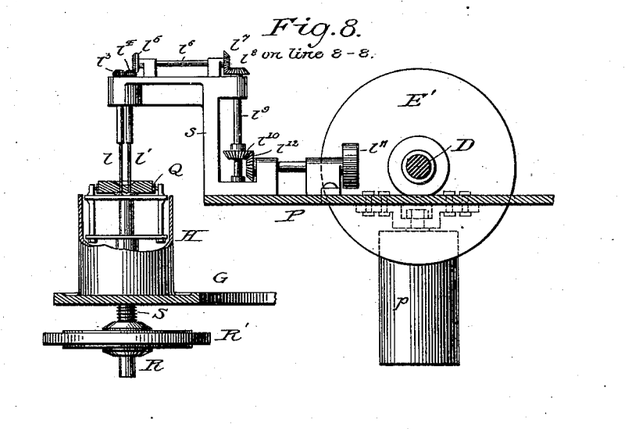
Fig. 8 is a vertical sectional elevation through the drilling mechanism on the line 8 8 of Fig. 1.
Figures 9, 12:
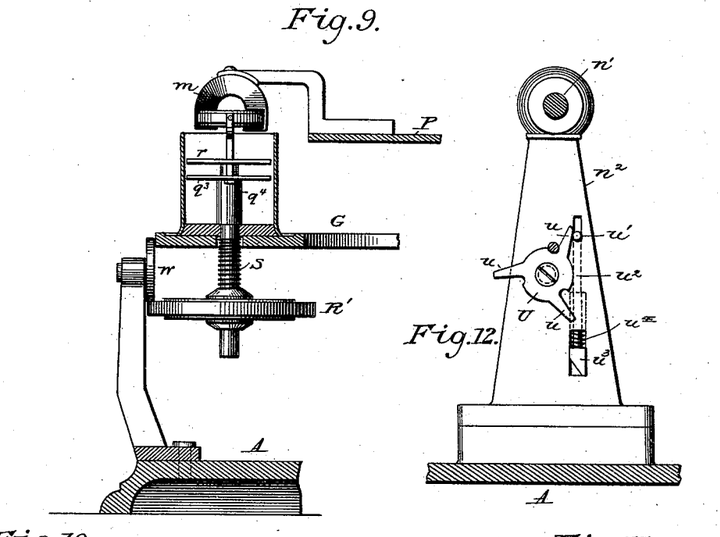
Fig. 9 is a vertical sectional elevation on the line 9 9 of Fig. 1.
Fig. 12 is a sectional elevation on the line 12 12 of Fig. 1.
Figures 10, 11:
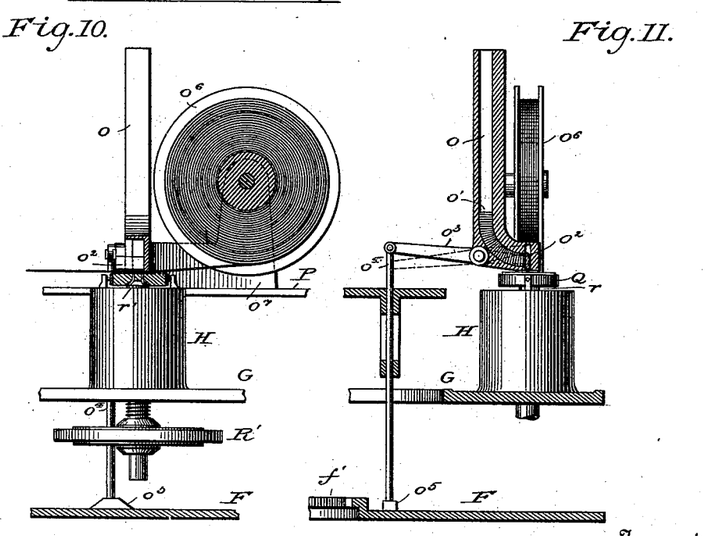
Fig. 10 is a sectional elevation of the device for attaching the buttons to a tape, taken on the line 10 10 of Fig. 1.
Fig. 11 is a side elevation of the same, looking in the direction indicated by the arrow in Fig. 1.
Figure 14:
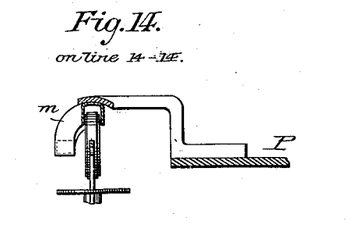
Fig. 14 is a section through the turning guide on the line 14 14 of Fig. 1.
Figure 15:
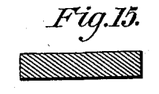
Figs. 15, 16, 17, 18, and 19 are views illustrating the button-blank in the successive stages of formation.
Figure 18:
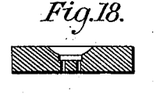

Referring to Figs. 1 and 7, the centering mechanism consists of a vertical rod $k$, adjustably sustained by means of a set-screw in the end of a bracket $k'$, secured to the plate P. The lower end of the rod is reduced and of cylindrical form, so that when the blank is presented against the same and rotated a circular cavity will be formed therein, as shown in Fig. 17. The blank next passes to the drilling mechanism, which, as shown in Fig. 8, consists of two vertical drills $l\ l'$, mounted side by side in a bracket $s$, rising from the plate P. The drills are provided above the bracket with intermeshing pinions $l^3\ l^4$, driven by a beveled pinion $l^5$ on a horizontal shaft $l^6$, mounted in the bracket. The horizontal shaft is provided with a beveled pinion $l^7$, which is engaged by a beveled pinion $l^8$ on the upper end of a vertical shaft $l^9$, also mounted in the bracket. Near its lower end the vertical shaft is provided with a beveled pinion $l^{10}$, meshing with a beveled pinion $l^{12}$, fixed on the end of a horizontal shaft, the other end of which carries a friction-wheel $l''$ in position to engage the vertical friction-wheel E', before alluded to, on the main driving-shaft, motion being thus imparted continuously from the main driving-shaft to the drilling mechanism. On the presentation of the blank to the drills two holes will be formed therein, as shown in Fig. 18. The blank next passes to the backing mechanism N. (Shown in Fig. 3.) It consists of a horizontal body $n$, similar to the body $j$ for facing the blanks, with the exception that its central portion is reduced and curved inward in such manner that when the back of the blank is presented and revolved in contact therewith it will be given the form represented in Fig. 19, the button being thus completed. This body $n$ is mounted at one end in the end of the main driving-shaft to revolve therewith, and at its opposite end it is sustained to turn within a horizontal centering-pin $n'$, mounted in the upper end of the post $n^2$, rising from the base-plate, and secured so that it may be adjusted longitudinally in a manner similar to the centering-pin $j'$, before alluded to. In its passage from the drilling to the backing mechanism it is necessary that the blank be turned in order that its under surface may be presented beneath the backing mechanism. This reversal of the blank is accomplished by the turning device M, which, as shown in Figs. 1, 9 and 14, consists of an elongated spiral or twisted body $m$ having a longitudinal opening therein from end to end. The body is so formed that the opening or groove will be disposed horizontally at its ends and will gradually assume a vertical position between its ends. As the chuck containing the button-blank advances to the guide its shaft carrying the plate $r$ will be lowered so that the split ring will be free to turn on its horizontal axis. As the movement of the chuck continues the side of the ring will enter the horizontal portion of the groove and will be tipped upward as it passes into the vertical portion of the groove. As it passes to the outer end, the opening will carry its upper edge beyond the center and will cause the ring to be moved on its horizontal axis until it is in a horizontal position, thus completing the reversal of the blank. In order that the shaft carrying the plate $r$ may be lowered to admit of the rotation of the split ring on its axis before entering the turning device, I journal on a standard rising from the base-plate, a vertical roller $w$ in such position that as the chuck passes the same its horizontal friction-wheel R' will encounter the roller and be forced downward thereby. After the blank has been backed and the button completed it is passed to the device by which it is secured to a tape or band. This device, as shown in Figs. 1, 10 and 11, consists of a vertical tube or reservoir $o$, for holding a series of staples $o'$. This reservoir is sustained by the plate P, and has its lower end open and bent laterally, and is provided in its side with a vertical slot through which a finger $o^2$ extends. The finger is carried by a lever $o^3$, pivoted at its center and operated by a vertical rod $o^4$, from a series of lugs $o^5$, carried by the plate F. At the proper times the lugs successively engage beneath the end of the rod, elevating the end of the lever and depressing the finger carried thereby, the staple under the finger being forced downward. Adjacent to the tube I mount a tape-carrying spool $o^6$, on a horizontal axis in the bracket $o^7$, in such position that the tape may be unwound and drawn beneath the end of the reservoir. As the button is presented in a horizontal position from the backing mechanism and arrives beneath the end of the reservoir, the finger, by means of its lever and the lugs on plate F, will be depressed, thereby forcing the underlying staple through the tape and into the two holes in the button. The ends of the staple encountering the washer $r'$, overlying plate $r$ of the chuck, will be bent outward and the button thus firmly attached to the tape. The tape may then be moved along by hand to receive the next button.

The various mechanisms hereinbefore described for acting successively on the button-blank in the course of its formation perform their functions while the blank is at rest as far as any movement of the plate G, supporting the chucks, is concerned. In order that this plate may thus remain at rest and be moved at the proper times to carry the blanks from one mechanism to another, I provide the continuously-rotating plate F with lugs $f^6$, corresponding in number to the number of chucks on the plate G, and provide the latter with corresponding depending rods $g$, having their ends arranged in the path of the lugs when the chucks are to be moved, and adapted to be elevated out of the path of the lugs when the chucks are to remain at rest. The device for effecting the elevation of the plate carrying the chucks and the bars attached thereto consists of two wheels U U' journaled on horizontal axes on the inner sides of the two posts $n^2 j^2$, respectively. These wheels are each provided with a hub from which project three teeth $u$, which are adapted successively to encounter the vertically-moving stop $u'$, and be held thereby. Each of the stops is carried at the upper end of a vertical rod $u^2$, mounted to slide within the posts, the rod being provided at its lower end with a beveled foot $u^3$, projected laterally from the post. A spiral spring $u^4$, bearing on the foot, holds the stop normally downward out of engagement with the teeth of the wheel. These two wheels are so located that as the plate G, carrying the chucks, is revolved, a series of radial teeth $g'$, projected from its edge and arranged adjacent to the chucks, will engage the wheels and ride upward on the hubs, as shown in Fig. 12. The arrangement is such that the two opposite teeth will engage the wheels at the same time, so that the plate G will be lifted bodily until the ends of the depending rods $g$ are out of engagement with the lugs $f$, in which position the elevated plate carrying the chucks will remain at rest, the plate F continuing its rotation.

In order that the chucks may again be lowered and advanced to the next mechanism to operate on the blank, I provide the plate F on its periphery with six fingers $f^7$, which are so arranged that the opposite fingers will successively encounter the beveled sides of the two feet $u^3$, connected to the stops, and will ride thereunder and elevate them, thereby raising the stops out of engagement with the wheels, which, owing to the weight of the plate G, sustained thereby, will be caused to turn, allowing the latter to descend and continue its course with the continuously-moving plate F. After the passage of the fingers under the feet $u^3$ the stops will descend again under the influence of their springs and be in position to encounter the next teeth on the wheels U, which will be held ready to again elevate the plate G. The elevation of the chucks continues successively when in position beneath the various mechanisms as the opposite teeth on plate G encounter the wheels, they being allowed to descend and continue their course to the next mechanism as the teeth on the continuously-moving plate engage the feet $u^3$.

The arrangement of the parts is such that when the chucks are elevated bodily the button-blank will be sustained a slight distance from the various mechanisms. In order that it may be held securely in the chuck in the horizontal position, and that it may be presented vertically in contact with the operating mechanisms after the chucks have been elevated bodily, I provide the under side of the plate F at intervals with six spring-plates $f^8$, secured at one end, and connect their free ends, by means of vertical rods $f^9$ extending through the plate F, with spring-plates $f^{10}$ attached to the upper side of the plate. The plates $f^8$ are adapted to engage the ends of vertical set-screws $f^{11}$, extending through the base-plate, so that as the plate F moves around, the spring-plates $f^8$ thereon, encountering the set-screws, will be elevated, and, owing to their connection, the overlying spring-plates $f^{10}$ will raise their free ends. The arrangement is such that the elevation of the spring-plates will occur after the chucks have been raised bodily and are at rest, the spring-plates being so located that at the time of their elevation they will be directly under the lower ends of the shafts R, the result being that each of the shafts will be carried upward, the circular plates $r$ sliding on the rods $q\ q'$ and engaging the cam-lugs $s\ s$ thereon, thereby clamping the ring together. The upward movement continuing, the ring is raised bodily a slight distance and forced against the operating-tool. The blank is held in this position until the end of the spring-plate disengages the set-screw $f^{11}$ and springs down to its normal position, when the spring S, acting on the shaft R, will return the same to its former position.

In order that the button-blanks may be rotated on vertical axes while being acted on by the continuously-moving facing and backing mechanisms, I provide the plate P with two oppositely-arranged vertical friction-drums $p$. These drums are engaged by the vertical friction-wheels E' E', before alluded to, and are rotated constantly on vertical axes. They are in such position that as the shafts R of the chucks are elevated by the spring-plates when the former are in position beneath the facing and backing mechanisms the horizontal friction-wheels R' of the chucks will come in contact with the friction-drums $p$ and will be rotated, thereby turning the button-blanks on vertical axes.

From the nature of the centering device it is necessary that the button-blank as it arrives beneath the same be given a rotation on a vertical axis. This is accomplished by means of a friction-wheel V, carried on one end of a horizontal shaft $b$, on the other end of which is a friction-wheel $b'$, engaging the vertical friction-wheel E', mounted on the main driving-shaft. The wheel V is sustained in such position that as the chuck arrives beneath the centering mechanism and its shaft is elevated the horizontal friction-wheel R' on the lower end of the same will engage the friction-wheel E' and be rotated thereby.

I propose to attach the brackets sustaining the filling and centering mechanisms and turning device so that they may be adjusted bodily in order to maintain them in their proper positions according as circumstances may require. This is accomplished by forming in the base of the bracket slots adapted to receive set-screws.

The operation of the machine is as follows: Power being applied through the band-pulley E on the main shaft, the facing, centering, drilling, and backing mechanisms receive motion and the button-blanks are supplied successively to the several chucks either by hand or by any suitable feeding device. It will be sufficient to describe here the course of a single button, it being understood that each blank takes the same course, that the several blanks carried by the several chucks are carried around by a step-by-step movement and presented successively to the several tools to be finished by successive operations, and that all the blanks are operated upon simultaneously by the respective tools to which they are presented. It will be further understood that at each forward movement of the chucks the chuck-carrying plate is raised to present the blanks to the tools; that the chuck-carrying plate, the chucks, and blanks are maintained in such elevated position a sufficient length of time to enable the tools to finish their respective operations; that after the tools have finished their respective operations the chuck-carrying plate is released and drops back to its lower position; that the plate and chucks are then carried forward another step and again elevated, and that these movements and operations are repeated indefinitely. The first blank having been placed upon one of the chucks at the proper point it is first carried under the filling device I. The chuck-carrying plate G is then raised in the manner and by the means above described and comes to rest. The plunger $i$ is then depressed and the blank forced down to its proper position in the split ring. The blank having been properly seated the chuck-carrying plate is released and drops back to its lower position. The chuck-carrying plate then moves forward another step, carrying the chuck and blank under the facing-tool $j$. Here it is again elevated to present the blank to the facing-tool and comes to rest. The facing-tool having performed its operation the plate is again released drops, and moves forward another step, is elevated, and comes to rest with the chuck and blank beneath the centering-tool which forms the central cavity in the blank. After this is done, the plate is released and lowered, moves forward another step, is raised, and comes to rest with the chuck and blank beneath the drilling-tools. On the completion of the drilling operation the plate and chuck are again lowered and carried forward another step, the chuck and blank passing, during this movement, under the turning device, which tilts or trips the ring on its horizontal axis and turns it over, bringing the under side of the blank to the top, in which position it is presented to the backing-tool $n$, the plate and chuck being arrested at the proper point and elevated as before to present the blank for the action of the backing-tool. After the backing-tool has completed its operation the plate and chuck are lowered as before and carried forward to the attaching device where the finished button is attached to a strip of fabric and removed from the chuck to be replaced by another blank, which takes the same course.

It will be understood from the detailed description herein that each chuck is rotated on its own axis only when presenting a blank to the facing, the centering, and the backing mechanisms, and that it is not so rotated when presenting the blank to the filling, the drilling, and the attaching devices. Hence the friction driving-gears are so disposed and arranged that the friction-wheels on the shafts of the chucks are engaged only at the proper points.

Having thus described my invention, what I claim is—

1. In a button making machine the combination of a series of finishing devices arranged at intervals, a movable holding chuck, means for moving said chuck, step-by-step, into coincidence with the several finishing devices in succession, means for advancing the chuck toward the finishing devices in the intervals of rest between succeeding step-by-step movements, and a separable gear thrown into and out of action by the forward and backward movements of the chuck for imparting rotary motion to the chuck while the latter is in position opposite the respective finishing devices.

2. In a button making machine the combination of a series of finishing devices arranged in a circular row, a blank-holding chuck movable in a path coincident with the row of finishing devices, means for moving said chuck step-by-step into coincidence with the several finishing devices in succession, means for advancing the chuck toward the finishing devices in the intervals of rest between succeeding step-by-step movements, means for revolving the chuck while in its advanced position, and means for throwing it out of action during the movement from one finishing device to the next.

3. In a button making machine the combination of a series of finishing devices arranged in a circular row at regular intervals, a continuously rotating driving shaft and connections therewith for driving said finishing devices, a rotatable chuck support and a series of chucks thereon arranged in a row coincident with the row of finishing devices and at corresponding intervals, a continuously rotating plate geared with the driving shaft, separable connections between said plate and the chuck-support for causing the latter to rotate with the former, means for breaking said connections when the chucks are in coincidence with the finishing devices, and means for advancing the chuck toward the finishing devices while the chuck support is at rest.

4. In a button making machine the combination of two rotary tools for forming, respectively, the front and back of a button, a holding chuck movable from one of said tools to the other, and a turning device in the path of the chuck to turn the blank in its passage from one tool to the other.

5. In a button making machine the combination of two rotary tools adapted to shape, respectively, the front and back of a button, a holding chuck movable from one of said tools to the other and capable of revolving on its own axis a device for turning the blank in its passage from one of said tools to the other, a driving shaft, and connections for imparting motion to said tools and chuck.

6. In a button making machine the combination of two rotary tools for shaping, respectively, the front and back of a button, a chuck for holding the blank, movable from one tool to the other, and a spiral turning device arranged in the path of the chuck to turn the blank.

7. In a button making machine two rotary tools for shaping, respectively, the front and back of a button, a chuck adapted to hold the blank, and movable from one of said tools to the other, said chuck comprising a clamping ring supported on a transverse axis and capable of turning thereon, in combination with a spiral turning device arranged in the path of the chuck and adapted to engage the latter and turn it in its passage from one tool to the other.

8. In a button making machine the combination of a holding chuck movable in a circular path step by step, a series of rotary tools adapted respectively to face, to center, and to bore the blank, a device for turning the blank, and a tool for shaping the back of the button, said tools and turning device being arranged in a circular line coincident with the path of movement of the chuck, means for operating said tools, and means for advancing the chuck.

9. The combination of the continuously-moving plate F, the intermittingly-moving plate G, driven thereby, the chucks sustained by plate G, the fixed mechanisms adapted to act successively on the button blank, and the movable supports adapted to sustain the plate G and hold the same in an elevated position, said support arranged to be operated by the plate F, to release the plate G.

10. In a button-making machine, the combination of the wheels U U', the plate G sustaining the chucks and provided with radial teeth to engage the wheels, the stops for holding the said wheels, and means for rotating the plate G and means for operating the stops to admit of the rotation of the wheels.

11. In a button-making machine, the combination of the intermittingly-rotating holding-chucks with the vertically-moving holding rings, of means for elevating the chucks bodily and thereafter for moving the rings.

12. In a button-making machine, the holding-chuck comprising the holding-ring mounted on a horizontal axis passing transversely through it, and the vertically-moving plate adapted to engage the ring and hold it in horizontal position.

13. In a button-making machine, a holding-chuck comprising the split ring mounted on a horizontal axis in supporting standards, and means for clamping said ring upon the blank and holding it in a horizontal position.

14. The chuck for a button-making machine consisting of the split ring, the vertical rods between which said ring is mounted to turn on a horizontal axis, the plates holding said rods and provided with a depending sleeve, the vertically-moving shaft extending through the sleeve and plate, and the plate carried at the upper end of said shaft and guided by said rods.

15. In a chuck for a button-making machine, the combination of a supporting plate, a vertical cylinder rising therefrom, a supporting sleeve, a plate at its upper end, vertical rods sustained by the plate and provided with cam lugs, the split ring sustained between said rods to turn on a horizontal axis, a shaft extending through the sleeve, and a plate carried by the shaft and provided with openings to receive the rods.

16. In a button-making machine, the combination of the main driving shaft, the friction wheel thereon, the friction drum engaging said wheel, the holding-chuck provided with a vertically-moving driving shaft and the friction wheel on the chuck driving shaft adapted to engage the drum when the shaft is raised.

17. In a button-making machine, the combination with the vertical friction drum, of the holding chuck, its driving shaft, the friction wheel thereon held normally out of engagement with the drum, and means for raising the wheel in engagement therewith.

18. In a button-making machine, the combination with the base-plate, the continuously-moving plate F, sustained thereby, the spring-plates carried by the plate F, and adapted to engage projections on the base plate and be raised, the plate G driven from plate F, and the holding-chucks thereon provided with the vertically moving driving shafts and pulleys, said shafts arranged to be engaged and elevated by the spring plates as the latter are raised.

19. In a button-making machine, the combination of the main driving shaft, the facing and backing mechanisms driven thereby at opposite ends, the vertical friction wheels on said shaft, the vertical drums driven thereby, the holding-chucks and their driving shafts, and the pulleys on said driving shafts arranged to be rotated by the friction drums.

20. In a button-making machine, the combination of the main driving-shaft, the vertical friction wheel, the counter-shaft V, driven therefrom, the friction wheel on said counter shaft, the fixed centering mechanism, the holding chuck, the vertically-moving driving-shaft provided with the friction wheel and means for elevating the same to engage the friction wheel on the counter-shaft.

21. The combination of the main driving shaft, the friction wheel thereon, the holding-chuck, the two drills geared together, the friction wheel $l^{11}$ engaging the wheel on the driving shaft, and intermediate gearing for driving the drills.

22. In a button making machine the combination of a series of finishing devices and a stapling mechanism arranged at regular intervals, a holding chuck movable step-by-step into coincidence with the several finishing devices and with the stapling mechanism, in succession, a main driving shaft, and devices operated thereby for advancing the chuck step-by-step, and for operating the stapling mechanism.

23. In a button making machine the combination of a series of finishing devices and a stapling mechanism arranged at intervals in a circular row, a chuck support and a series of chucks thereon arranged in a row coincident with the finishing devices and stapling mechanism, a driving shaft, means operated thereby for moving the chuck support step-by-step to bring each chuck successively into coincidence with the several finishing devices and with the stapling mechanism, and means connected with the chuck moving mechanism for operating the stapling mechanism, whereby the buttons are attached to a support before they are removed from the chucks.

24. In a button-making machine, the combination of the base-plate, the standard C rising therefrom, the main driving shaft mounted in bearings in said standard, the facing and backing mechanisms driven from said shaft at opposite ends, the fixed filling, centering and drilling mechanisms, the turning device located between the drilling and backing mechanisms, the mechanism for driving the staples, the continuously-moving plate F, the teeth thereon, the intermittingly-moving plate G, the lifting mechanism for said plate adapted to be operated by the teeth on plate F, the series of chucks carried by the plate G, and provided with driving shafts and means for rotating said shafts when the chucks are elevated.

25. In a button making machine, the combination with the movable holding chuck constructed to sustain the button blank on a horizontal axis of the fixed turning device consisting of the spiral body provided with a longitudinal groove disposed horizontally at its ends and vertically between its ends.

26. In a button making machine the combination of the driving shaft supported in bearings in the frame, a series of finishing tools supported from a fixed platform and arranged in a circular line, a continuously rotating platform driven from the main shaft, an intermittently rotating platform driven from the continuously rotating platform, and a series of holding chucks thereon, means for elevating the intermittently rotating platform and holding it stationary, means for elevating the chucks, and means for releasing and lowering the chuck-carrying platform.

27. In a button making machine the combination with a vertically reciprocating head carrying a series of button holding chucks, of a series of tools held in fixed relation to said reciprocating head, a feed mechanism to impart an axial step-by-step movement to said head simultaneously with its reciprocating movements, and an automatic locking mechanism engaging with said head and holding it in a fixed position as it is raised to bring its chucks in close relation to the series of tools.

28. In a button forming machine, the combination of an intermittently moving chuck carrier, two or more rotary blank holding chucks, power transmitting devices for rotating said chucks independently of each other, and a non-rotating forming tool adapted to act upon a button blank during the intervals of rest of the carrier.

29. In a button forming machine, the combination of an intermittently rotating chuck carrier, a non-rotating forming tool adapted to act upon a button blank during the intervals of rest of the carrier, a continuously rotating driving wheel, and two or more rotary blank holding chucks each having a driving wheel adapted to be engaged by said continuously rotating driving wheel when the chuck is presented to said forming tool.

In testimony whereof I hereunto set my hand, this 25th day of July, 1892, in the presence of two attesting witnesses.

ELIHU LIPPITT.

Witnesses:
F. H. BLOOMINGDALE,
SÉLINE LEGG.